April 29, 1941.                F. A. CERNE                2,240,091
             ANTIBACKLASH ATTACHMENT FOR FISHING REELS
                   Filed June 6, 1940        2 Sheets-Sheet 1

Inventor
Fredy August Cerne.

By Clarence A. O'Brien

Attorneys

April 29, 1941.  F. A. CERNE  2,240,091
ANTIBACKLASH ATTACHMENT FOR FISHING REELS
Filed June 6, 1940  2 Sheets-Sheet 2
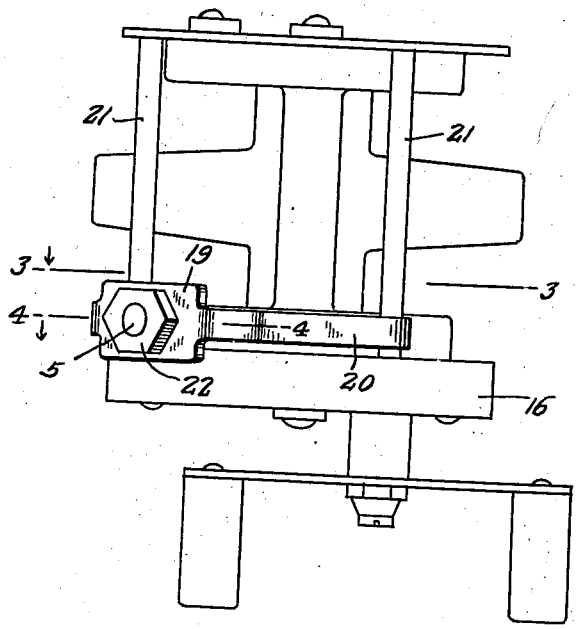
Fig. 2.
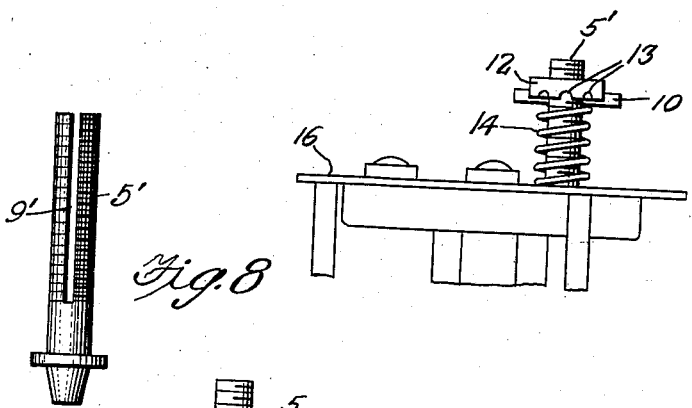
Fig. 7.
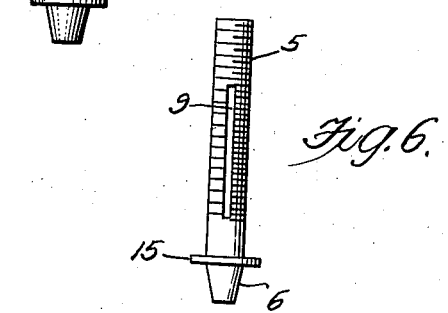
Fig. 8.
Fig. 6.
Inventor
Fredy August Cerne.
By Clarence A. O'Brien
Attorneys Patented Apr. 29, 1941

2,240,091

UNITED STATES PATENT OFFICE 2,240,091

ANTIBACKLASH ATTACHMENT FOR FISHING REELS

Fredy August Cerne, Chicago, Ill.

Application June 6, 1940, Serial No. 339,167

3 Claims. (Cl. 242—84.5)

This invention relates to fishing reels and more particularly to a device fastened to the frame of the reel for the purpose of automatically preventing backlash of the fishing line as the line is cast.

Among the objects of the present invention is to provide an anti-backlash attachment for fishing reels that is generally an improvement upon such attachments as now known and used; and the invention together with its objects and advantages will be best understood from a study of the following description taken in connection with the accompanying drawings wherein:

Figure 2 is a top plan view of the reel with the attachment applied thereto.

Figure 4:
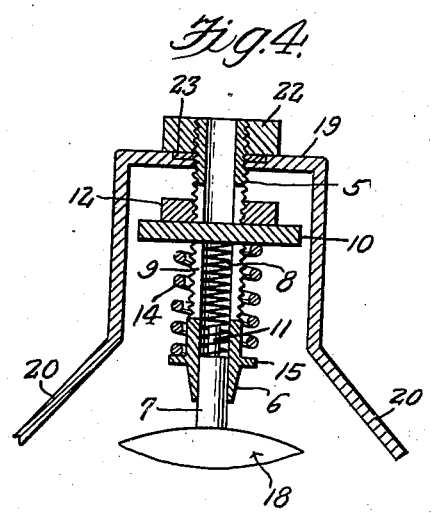
Figure 3:
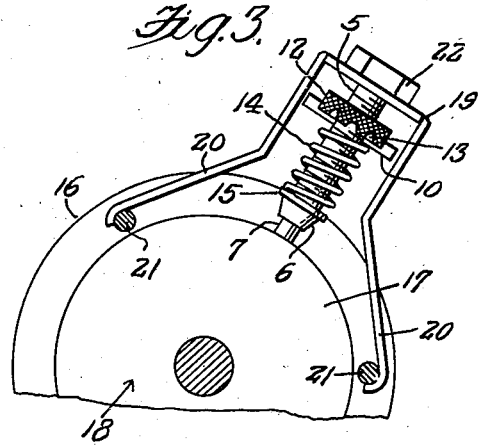

Figures 3 and 4 are detail sectional views taken substantially on the lines 3—3 and 4—4 respectively of Figure 2.

Figure 1:
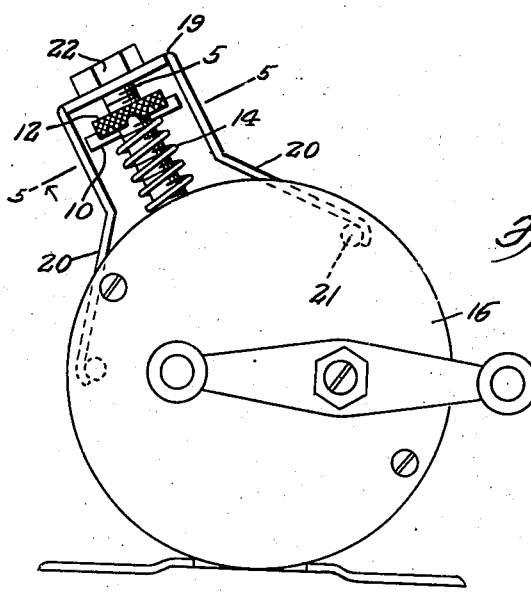
Figure 1 is a side elevational view of a fishing reel equipped with an anti-backlash attachment embodying the features of this invention.
Figure 5:
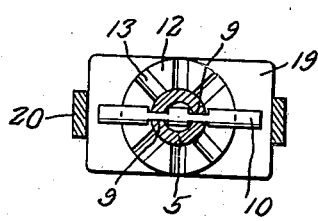

Figure 5 is a detail sectional view taken substantially on the line 5—5 of Figure 1.

Figure 6 is an elevational view of a tubular member forming part of the invention, and Figure 7 is a fragmentary top plan view illustrating a slightly modified form of the invention Figure 8 is a view of the tubular member used with that form of the invention shown in Figure 7.

Referring more in detail to the drawings it will be seen that the anti-backlash attachment comprises, essentially, a barrel or tubular member 5 which at one end is tapered as at 6 and has projectible through said end 6 thereof a plug 7 that is normally urged outwardly with respect to said end 6 of the barrel 5 through the medium of a relatively light coil spring 8 housed within the barrel as shown.

The barrel 5 is provided on diametrically opposite sides thereof with slots 9 elongated longitudinally of the barrel to accommodate a transverse pin 10 that extends transversely through the barrel and against which one end of the spring 8 impinges. The other end of the spring impinges against the inner end of the plug 7 and is convoluted about an integral pin 11 extending inwardly from said inner end of the plug 7. (See Fig. 4.)

For adjusting tension of the spring 8 there is threadedly engaged with the barrel 5 a nut 12 against which the pin 10 impinges, and on the bottom side thereof the nut 12 is provided with a circular series of notches 13 as shown, and obviously as the notched edge of the nut 12 rides over the pin 10 in effecting, by rotation of the nut 12, an adjustment of the tension of spring 8, the resulting "click" can be used to advantage in approximating the amount of spring tension adjustment being made.

Also in accordance with the present invention there is disposed about the barrel 5 a relatively strong coil spring 14 and one end of the spring 14 seats against an integral collar or flange 15 provided at the tapered end of the barrel 5 while the other end of said spring impinges against the pin 10 as shown.

From the description of the invention thus far it will be apparent that when the attachment is properly mounted on the reel frame 16 the plug 7, in response to the action of spring 8, will have frictional bearing contact with the adjacent end plate 17 of the reel spool indicated generally by the reference numeral 18 to arrest properly the rotation of the reel at the end of the cast thus preventing the undesired "backlash" that often takes place at this point.

When it is desired to mount the device on the reel as shown in Figures 1 to 4 inclusive, there is provided a substantially U-shaped bracket 19, the legs 20 of which intermediate their respective ends are bent outwardly as shown and have their terminals engaged with two of the stay posts 21 of the reel as shown and welded or otherwise positively secured thereto so as to extend from the reel radially and as illustrated.

At the bight or closed end thereof the frame 19 is provided with a threaded opening to receive an end of the barrel 5 as shown, and threaded on this end of the barrel 5 into contact with the bight or closed end of the frame 19 is a nut 22.

As shown in Figure 4 the bight or closed end of the frame or bracket 19 is provided with a recess circumjacent the opening provided therein for the barrel 5, and seated in this recess is a washer 23.

When using the frame 19 for mounting the device on the reel the spring 14 is compressed sufficiently to insure the action of the spring 14 against the pin 10 for urging the same into seated engagement with opposed notches 13 in the nut 12. After the installation has been made then the nut 12 is adjusted on the barrel 5 to the extent desired in order that the spring 8 will cause the plug 7 to maintain proper friction contact with the side flange 17 of the spool 18 to the end that the device will function properly and as intended.

When it is desired to mount the device at the side of the reel as suggested in Figure 7, the frame or bracket 19 is dispensed with and the end 6 of the barrel 5' extended through an opening in the side of the reel so that the plug 7 will be in a position to engage an adjacent side flange 17 of the spool 18; all other parts of the assembly being used with the exception, as stated, of the bracket 19 and nut 22.

In this connection, however, it is to be noted that when the device is mounted on the side of the reel as shown in Figure 7, the slots 9' in the barrel 5' are extended to the extreme outer end of the barrel, as shown in Figure 8, to permit the pin 10 to be engaged with the slots by moving the pin longitudinally inwardly of the barrel 5' instead of passing the pin laterally through the slots transversely to the barrel as would be the case where the slots are closed at their ends, as for example as shown in Figure 6. In this latter case the barrel has its side parts pressed outwardly by the insertion of a suitable tool through the slots 9 so that the pin 10 can be passed through the barrel to place the notches, shown in Figure 5, opposite the slots. Then the side portions of the barrel are pressed inward again to cause the side walls of the slots to engage the notches in the pin as shown in Figure 5.

It is thought that a clear understanding of the construction, utility, operation and advantages of an attachment of this character will be had without a more detailed description thereof.

It is also to be understood that while I have herein shown and described a preferred embodiment of the invention, it is in no wise intended to restrict the invention to the precise details of construction, combination and arrangement of elements as herein illustrated and described, other than as may be required by the prior art and scope of the claims appended hereunto.

It will also be understood that among the advantages of an anti-backlash attachment involving the features of the present invention are: the attachment can be mounted on the reel of the fly rod at the side thereof opposite to the handle of the reel; that the device may be used as a replacement for the ratchet-clicking device now generally forming the part of such reel equipment; but one hand need be employed in operating the fly rod fishing apparatus, and that the paying out of the fishline can be accomplished in a more efficient manner and to the end that the desired length of the line may be paid out a little at a time and without the immediate and conscious attention of the fisherman.

A further advantage of this invention lies in the construction and use of the adjusting nut 12 which, by reason of the notches provided therein, and the engagement of the spring-pressed pin with said notches, provides for a substantial locking of the nut in the position to which moved, and against being casually or easily displaced.

Having thus described the invention what is claimed as new is:

1. In an anti-backlash attachment for a fishing reel, a barrel adapted to be mounted on the frame of the reel, a plug having a sliding fit in one end of the barrel and arranged to frictionally contact the spool of the reel, said barrel having diametrically opposed slots elongated longitudinally thereof, a pin extending transversely through the barrel and having an intermediate portion engaging in said slots, a relatively light coil spring housed in the barrel and having one end impinging on said plug and a second end impinging against said pin, and a nut axially adjustable on the barrel exteriorly thereof and against which said pin abuts.

2. In an anti-backlash attachment for a fishing reel, a barrel adapted to be mounted on the frame of the reel, a plug having a sliding fit in one end of the barrel and arranged to frictionally contact the spool of the reel, said barrel having diametrically opposed slots elongated longitudinally thereof, a pin extending transversely through the barrel and having an intermediate portion engaging in said slots, a relatively light coil spring housed in the barrel and having one end impinging on said plug and a second end impinging against said pin, and a nut axially adjustable on the barrel exteriorly thereof and against which said pin abuts, said barrel at the plug-equipped end thereof being provided with an external collar, and a relatively strong coil spring disposed exteriorly of the barrel and having one end impinging against said collar and a second end impinging against said pin, as and for the purpose specified.

3. In an anti-backlash attachment for a fishing reel, a barrel adapted to be mounted on the frame of the reel, a plug having a sliding fit in one end of the barrel and arranged to frictionally contact the spool of the reel, said barrel having diametrically opposed slots elongated longitudinally thereof, a pin extending transversely through the barrel and having an intermediate portion engaging in said slots, a relatively light coil spring housed in the barrel and having one end impinging on said plug and a second end impinging against said pin, and a nut axially adjustable on the barrel exteriorly thereof and against which said pin abuts, said barrel at the plug-equipped end thereof being provided with an external collar, and a relatively strong coil spring disposed exteriorly of the barrel and having one end impinging against said collar and a second end impinging against said pin, and said nut having on the side thereof contacted by said pin a circular series of notches for cooperation with the pin to give a "clicking" sound incidental to the adjustment of the nut on the barrel to facilitate determining approximately the amount of tension on said springs.

FREDY AUGUST CERNE.